United States Patent
Shen et al.

(10) Patent No.: US 7,790,260 B2
(45) Date of Patent: Sep. 7, 2010

(54) WINDOW FOR ELECTRONIC DEVICE

(75) Inventors: Zhi-Yun Shen, Shenzhen (CN); Chih-Chiang Chang, Taipei Hsien (TW); Zhi Li, Shenzhen (CN); Tao Su, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/327,479

(22) Filed: Dec. 3, 2008

(65) Prior Publication Data
US 2009/0317646 A1    Dec. 24, 2009

(30) Foreign Application Priority Data
Jun. 19, 2008    (CN)    .................. 2008 1 0302205

(51) Int. Cl.
B32B 27/06    (2006.01)
B32B 27/08    (2006.01)
B32B 27/30    (2006.01)
B32B 27/36    (2006.01)

(52) U.S. Cl. .............. 428/47; 428/44; 428/48; 428/77; 428/78; 428/343; 428/354; 428/355 R; 428/355 N; 428/480; 428/483

(58) Field of Classification Search ........ None
See application file for complete search history.

(56) References Cited

U.S. PATENT DOCUMENTS

| | | | | |
|---|---|---|---|---|
| 4,762,227 A | * | 8/1988 | Patterson | 206/320 |
| 5,189,405 A | * | 2/1993 | Yamashita et al. | 313/512 |
| 5,290,825 A | * | 3/1994 | Lazar | 523/176 |
| 5,726,531 A | * | 3/1998 | Hirose et al. | 313/509 |
| 6,556,189 B1 | * | 4/2003 | Takahata et al. | 345/173 |
| 6,582,789 B1 | * | 6/2003 | Sumi | 428/40.1 |
| 6,621,473 B2 | * | 9/2003 | Lai et al. | 345/32 |
| 6,798,467 B2 | * | 9/2004 | Tasaki et al. | 349/58 |
| 7,215,305 B2 | * | 5/2007 | Ito et al. | 345/76 |
| 7,228,157 B2 | * | 6/2007 | Lee | 455/566 |
| 2003/0113581 A1 | * | 6/2003 | Gotou | 428/690 |
| 2005/0128760 A1 | * | 6/2005 | Moser | 362/488 |
| 2007/0053063 A1 | * | 3/2007 | Adachi et al. | 359/582 |

FOREIGN PATENT DOCUMENTS

JP    11-174417    *    7/1999

* cited by examiner

Primary Examiner—Vivian Chen
(74) Attorney, Agent, or Firm—Steven M. Reiss

(57) ABSTRACT

A window for use in an electronic device is provided. The window includes a display section and a strengthening layer. The display section is made of polyethylene terephthalate and overlaps with the strengthening layer. The strengthening layer is made of polymethyl methacrylate. The window is adhered to the electronic device with a transparent cyanoacrylate adhesive.

2 Claims, 4 Drawing Sheets

WINDOW FOR ELECTRONIC DEVICE

BACKGROUND

1. Field of the Invention

The present invention relates to windows, particularly to windows for electronic devices.

2. Description of Related Art

Portable electronic devices such as mobile phones, laptops and personal digital assistants (PDAs) are in wide-spread use. The portable electronic devices usually include an internal display protected e.g., from external damage, by a window.

Windows have been made of acrylonitrile-butadiene-styrene or polycarbonate. These materials may provide sufficient hardness and wear resistance for the windows, to affectively protect the display. However, windows made from these materials may have an uncomfortable touch for users.

Therefore, there is room for improvement within the art.

BRIEF DESCRIPTION OF THE DRAWINGS

Many aspects of the exemplary window for electronic device can be better understood with reference to the following drawings. These drawings are not necessarily drawn to scale, the emphasis instead being placed upon clearly illustrating the principles of the present methods. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Figure 1:
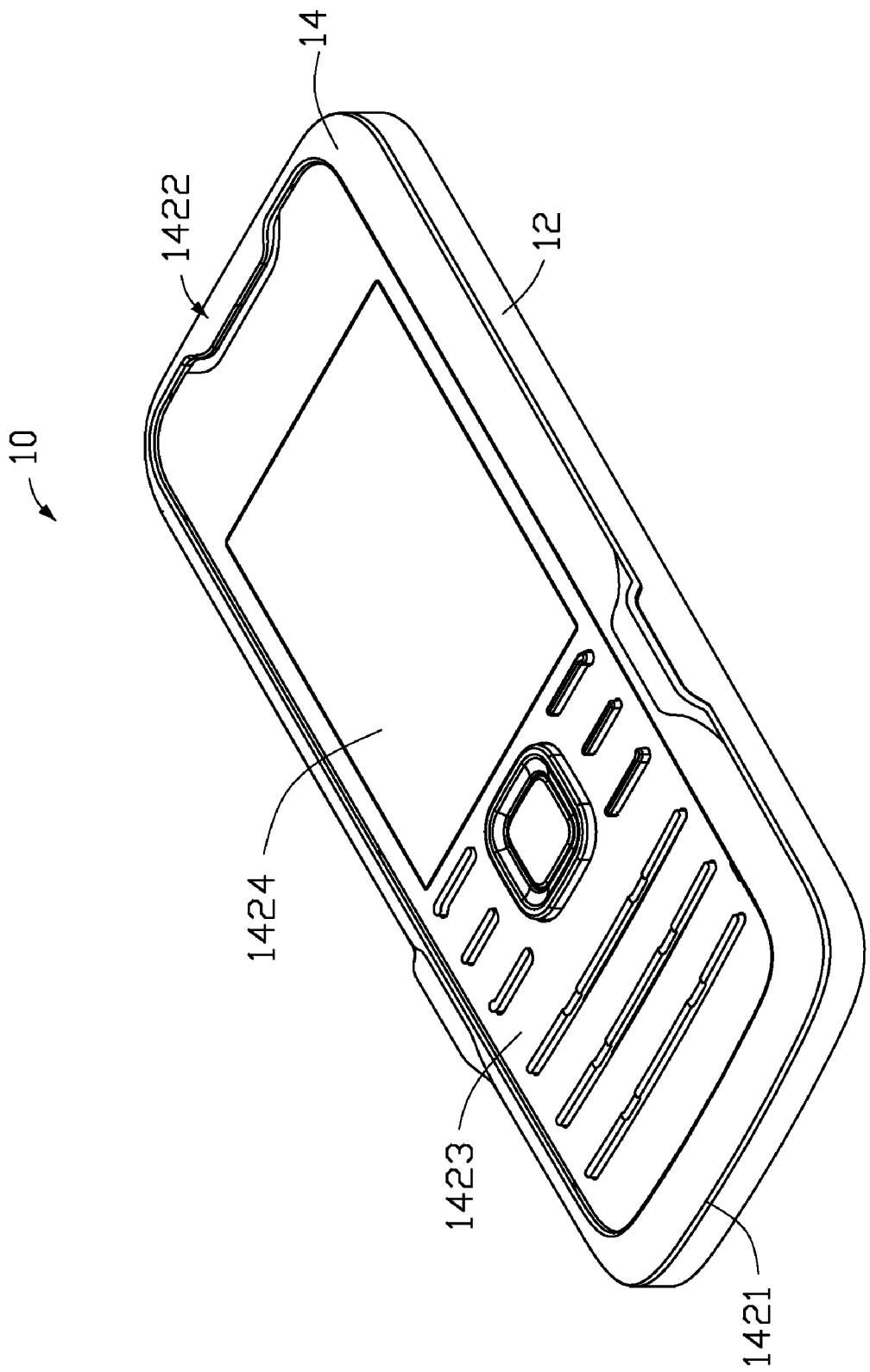
FIG. 1 is a schematic and assembled view of an electronic device using a housing in accordance with an exemplary embodiment.

FIG. 1 shows an electronic device 10 (such as mobile phone) including a first housing 12 and a second housing 14 secured to the first housing 12.

Figure 2:
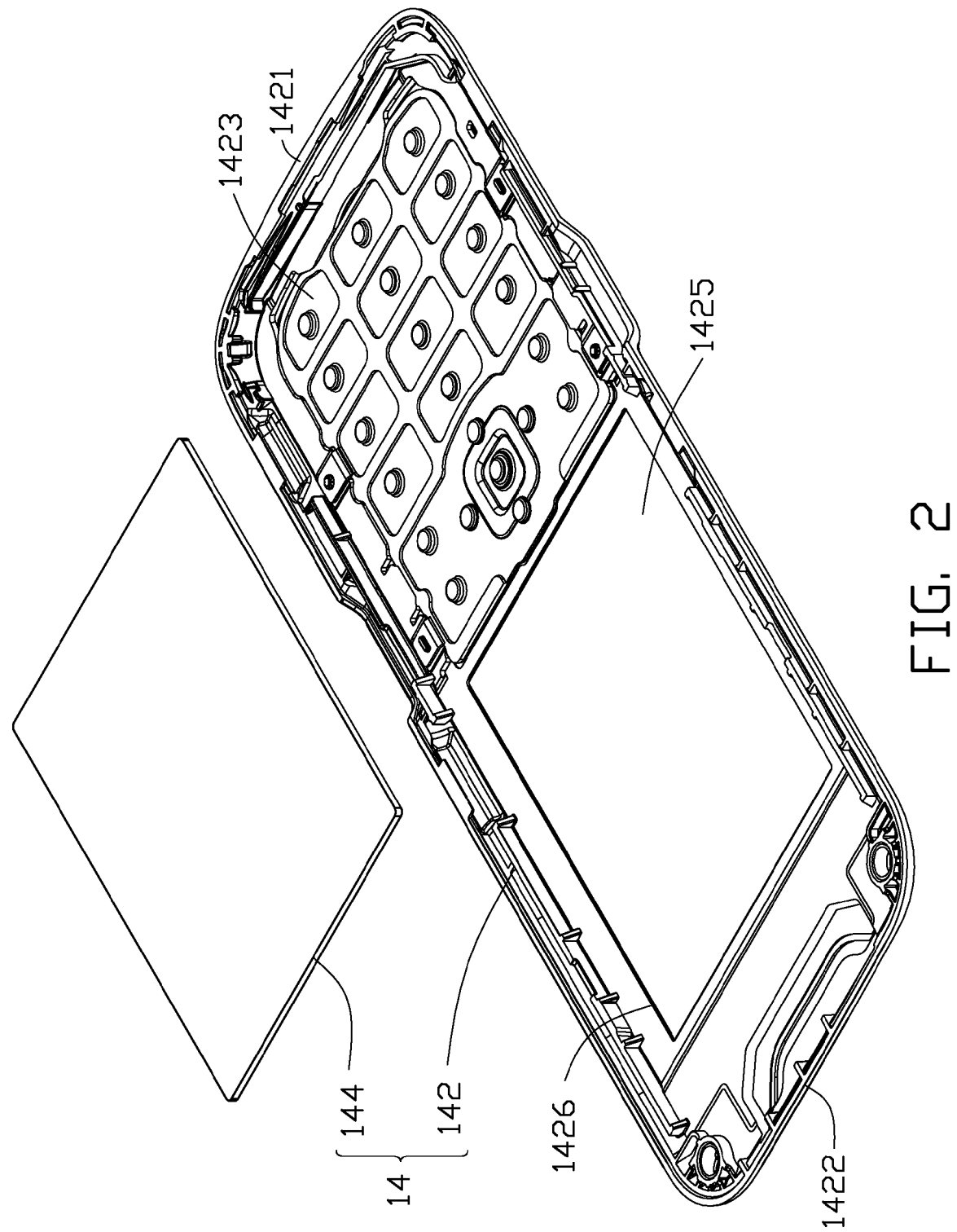
FIG. 2 is a schematic and an exploded view of the housing shown in FIG. 1.

Referring to FIG. 2, the first housing 12 includes a base 142 and a transparent strengthening layer 144 attached to the base 142. The base 142 is generally rectangular including a first end 1421 and an opposite second end 1422. The base 142 has a key section 1423 near the first end 1421 and a transparent display section 1424 (FIG. 1) near the second end 1422. The base 142 has a concave portion 1425 having a bottom wall 1426. The concave portion 1425 can receive the transparent strengthening layer 144. The base 142 may be made of polyethylene terephthalate (PET) to have a soft and comfortable touch.

Figure 3:
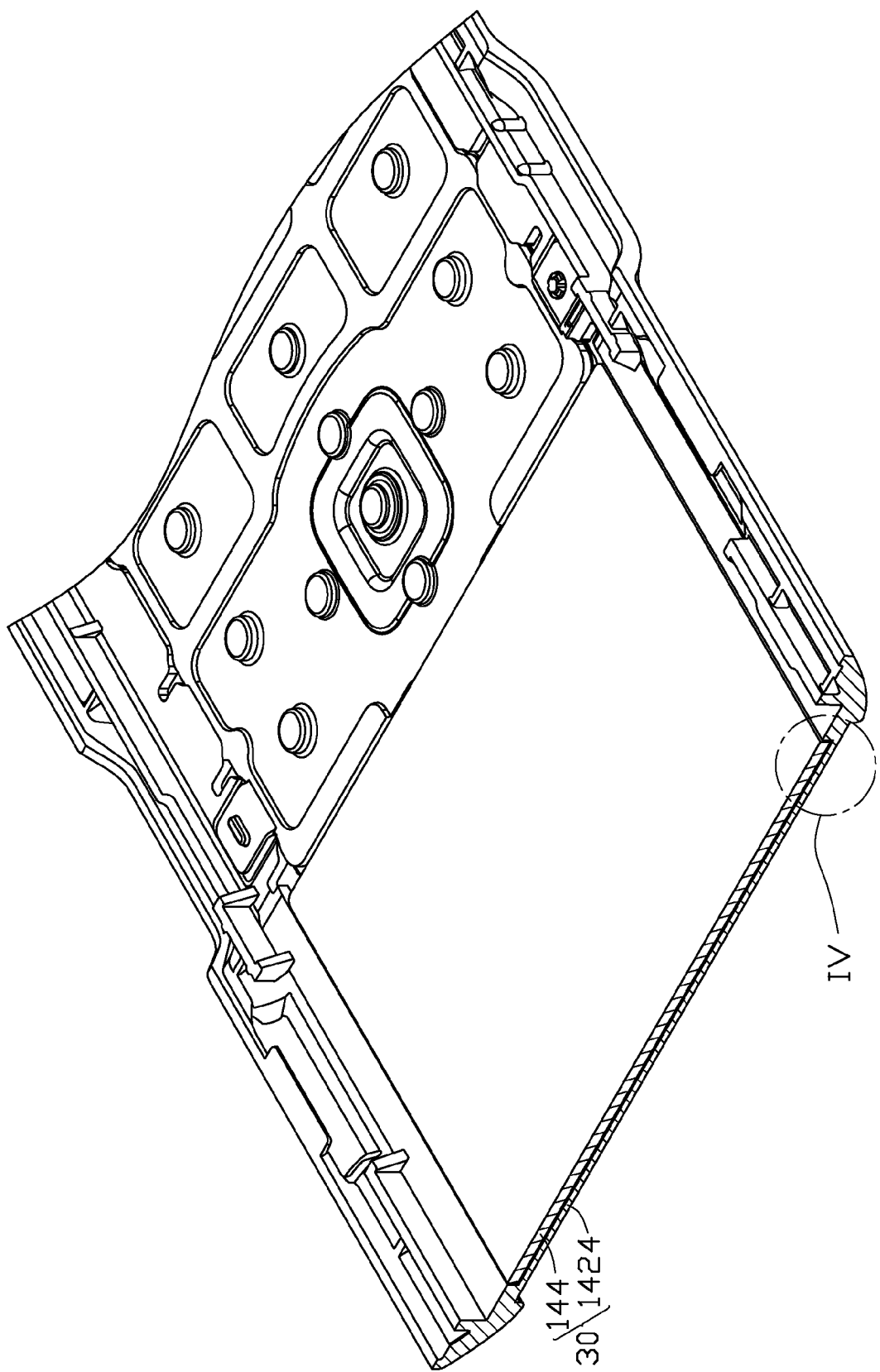
FIG. 3 is a schematic and cross sectional view of the housing shown in FIG. 1.
Figure 4:
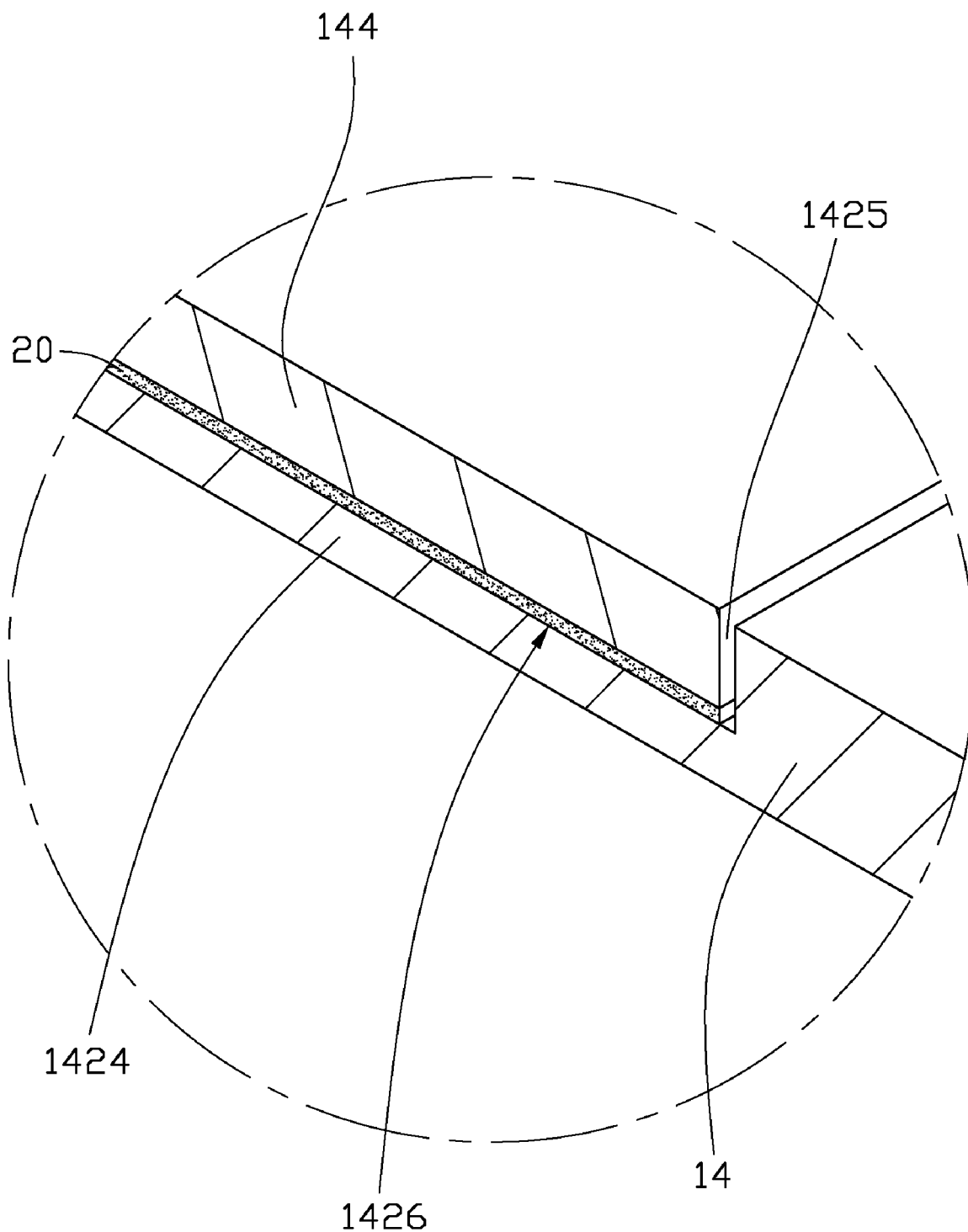
FIG. 4 is a schematic and partially enlarged view of the housing shown in FIG. 3.

Referring to FIGS. 3 and 4, the transparent strengthening layer 144 has substantially the same size and shape as the concave portion 1425. The transparent strengthening layer 144 is received in the concave portion 1425 adjacent and overlapping transparent display section 1424 and is adhered to portions of the bottom wall 1426 by an adhesive 20. As such, the transparent strengthening layer 144 and the adjacent transparent display section 1424 define a window 30. The adhesive 20 should be transparent, e.g. octyl-cyanoacrylate (OCA).

The transparent strengthening layer 144 can be made of PMMA, which has sufficient hardness and wear resistance for the window 30, thus effectively protect a display (not shown) in the first housing 12 from deformation. Additionally, the transparent display section 1424 can be made of PET, which has a soft and comfortable touch for the window 30.

Accordingly, instead of the window being made of a hard, wear resistant material that is uncomfortable to the touch, a softer material may be used for the transparent display section 1424 and reinforced by the transparent strengthening layer 144.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A window for use in an electronic device, comprising:
   a transparent display section, the transparent display section for being exposed to a user's touch, the transparent display section being made of polyethylene terephthalate;
   a transparent strengthening layer, the transparent display section overlapping the transparent strengthening layer and the transparent strengthening layer for strengthening the window, the transparent strengthening layer being made of polymethyl methacrylate, and
   a transparent adhesive, the transparent adhesive is configured to adhere the transparent display section to a portion of the electronic device, the transparent adhesive is octyl-cyanoacrylate.

2. A housing for use in electronic device, comprising:
   a base; and
   a transparent window attached to the base, the window including:
   a transparent display section for being exposed to a user's touch, the transparent display section being made of polyethylene terephthalate;
   a transparent strengthening layer for strengthening the window and the transparent strengthening layer overlapping with the transparent display section, the transparent strengthening layer being made of polymethyl methacrylate, and
   a transparent adhesive, the transparent adhesive is configured to adhere the transparent display section to a portion of the base, the transparent adhesive is octyl-cyanoacrylate.

* * * * *